US008155340B2

(12) United States Patent
Garudadri et al.

(10) Patent No.: US 8,155,340 B2
(45) Date of Patent: Apr. 10, 2012

(54) METHOD AND APPARATUS FOR RENDERING AMBIENT SIGNALS

(75) Inventors: Harinath Garudadri, San Diego, CA (US); Somdeb Majumdar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 751 days.

(21) Appl. No.: 12/261,529

(22) Filed: Oct. 30, 2008

(65) Prior Publication Data

US 2010/0020978 A1 Jan. 28, 2010

Related U.S. Application Data

(60) Provisional application No. 61/083,449, filed on Jul. 24, 2008.

(51) Int. Cl.
*H04B 7/00* (2006.01)

(52) U.S. Cl. ............... 381/77; 381/79; 381/91; 381/111

(58) Field of Classification Search .............. 381/56–57, 381/74, 104, 107, 312, 371; 455/556.1, 567, 455/575.2
See application file for complete search history.

(56) References Cited

U.S. PATENT DOCUMENTS

| | | | |
|---|---|---|---|
| 4,491,980 | A | 1/1985 | Ichikawa |
| 5,694,467 | A | 12/1997 | Young, III |
| 6,782,106 | B1 | 8/2004 | Kong |
| 2008/0079571 | A1 | 4/2008 | Samadani |

FOREIGN PATENT DOCUMENTS

| | | |
|---|---|---|
| WO | WO0038495 | 7/2000 |
| WO | 2007007916 | 1/2007 |
| WO | 2008077981 | 7/2008 |

OTHER PUBLICATIONS

International Search Report—PCT/US09/032883, International Search Authority—European Patent Office—May 11, 2009.
Written Opinion—PCT/US09/032883, International Search Authority—European Patent Office—May 11, 2009.

*Primary Examiner* — Dung A. Le
(74) *Attorney, Agent, or Firm* — Dang M. Vo; Paul S. Holdaway

(57) ABSTRACT

An apparatus and method for communications is disclosed. The apparatus includes a receiver configured to scale an audio signal, and a transducer circuit configured to provide an ambient signal in response to an ambient condition, wherein the receiver is further configured to scale the ambient signal from the transducer circuit and combine the scaled ambient signal with the scaled audio signal, the receiver being further configured to adjust the scaling applied to at least one of the ambient and audio signals.

34 Claims, 4 Drawing Sheets

METHOD AND APPARATUS FOR RENDERING AMBIENT SIGNALS

CLAIM OF PRIORITY UNDER 35 U.S.C. §119

The present Application for Patent claims priority to Provisional Application No. 61/083,449 entitled "METHOD AND APPARATUS FOR RENDERING AMBIENT SIGNALS" filed Jul. 24, 2008, and assigned to the assignee hereof and hereby expressly incorporated by reference herein.

BACKGROUND

1. Field

The present disclosure relates generally to communication systems, and more particularly, to receivers for rendering ambient signals in a communications system.

2. Background

Peer-to-peer networks are commonly used for connecting wireless devices via ad-hoc connections. These networks differ from the traditional client-server model where communications are usually with a central server. A peer-to-peer network has only equal peer devices that communicate directly with one another. Such networks are useful for many purposes. A peer-to-peer network may be used, for example, as a consumer electronic wire replacement system for short range or indoor applications. These networks are sometimes referred to as Wireless Personal Area Networks (WPAN) and are useful for efficiently transferring video, audio, voice, text, and other media between wireless devices over a short distance. By way of example, a digital audio player may be used to stream audio to a headset. As another example, a cell phone may establish a connection with a headset to allow hands-free operation by the user.

Headsets that provide hands-free conversational services and/or audio playback capability are becoming of great interest for short range communications. These headsets generally provide good insulation from ambient condition to maintain audio quality. As a result, a user is typically required to remove the headset to engage in face-to-face conversation with a person or hear a broadcast from a different speaker device. Accordingly, there is a need in the art for an improved receiver that better enables a user of a headset to interact with ambient sound source.

SUMMARY

In one aspect of the disclosure, an apparatus for communication includes a receiver configured to scale an audio signal, and a transducer circuit configured to provide an ambient signal in response to an ambient condition, wherein the receiver is further configured to scale the ambient signal from the transducer circuit and combine the scaled ambient signal with the scaled audio signal, the receiver being further configured to adjust the scaling applied to at least one of the ambient and audio signals.

In another aspect of the disclosure, a method for communication includes receiving an audio signal, scaling the audio signal, providing an ambient signal in response to an ambient condition, scaling the ambient signal, adjusting the scaling applied to at least one of the ambient and audio signals, and combining the scaled ambient signal with the scaled audio signal.

In yet another aspect of the disclosure, an apparatus for communication includes means for receiving an audio signal, means for scaling the audio signal, means for providing an ambient signal in response to an ambient condition, means for scaling the ambient signal, means for adjusting the scaling applied to at least one of the ambient and first audio signals, and means for combining the scaled ambient signal with the scaled audio signal.

In yet a further aspect of the disclosure, a computer program product for communication includes a computer-readable medium comprising instructions executable to receive an audio signal from an electronic source, scale the audio signal, receive an ambient signal that is generated in response to an ambient condition, scale the ambient signal, adjust the scaling applied to at least one of the ambient and audio signals, and combine the scaled ambient signal with the scaled audio signal.

In yet a further aspect of the disclosure, a headset includes a speaker, a receiver configured to scale an audio signal, a transducer circuit configured to provide an ambient signal in response to an ambient condition, wherein the receiver is further configured to scale the ambient signal from the transducer circuit, combine the scaled ambient signal with the scaled audio signal, and provide the combined scaled ambient and audio signals to the speaker, the receiver being further configured to adjust the scaling applied to at least one of the ambient and first audio signals.

In another aspect of the disclosure, a watch includes a user interface, a receiver configured to scale an audio signal, a transducer circuit configured to provide an ambient signal in response to an ambient condition, wherein the receiver is further configured to scale the ambient signal from the transducer circuit, combine the scaled ambient signal with the scaled audio signal, and provide the combined scaled ambient and audio signals to the user interface, the receiver being further configured to adjust the scaling applied to at least one of the ambient and first audio signals.

In yet another aspect of the disclosure, a sensing device includes a sensor, a receiver configured to scale an audio signal, a transducer circuit configured to provide an ambient signal in response to an ambient condition, wherein the receiver is further configured to scale the ambient signal from the transducer circuit, combine the scaled ambient signal with the scaled audio signal, and provide the combined scaled ambient and audio signals to the sensor, the receiver being further configured to adjust the scaling applied to at least one of the ambient and first audio signals.

It is understood that other aspects of the present disclosure will become readily apparent to those skilled in the art from the following detailed description, wherein it is shown and described only exemplary aspects of the disclosure by way of illustration. As will be realized, the disclosure includes other and different aspects and its several details are capable of modification in various other respects, all without departing from the scope of the present disclosure. Accordingly, the drawings and the detailed description are to be regarded as illustrative in nature and not as restrictive.

BRIEF DESCRIPTION OF THE DRAWINGS

Various aspects of the present disclosure are illustrated by way of example, and not by way of limitation, in the accompanying drawings, wherein like reference numerals may be used to denote like features throughout the disclosure.

Figure 1:
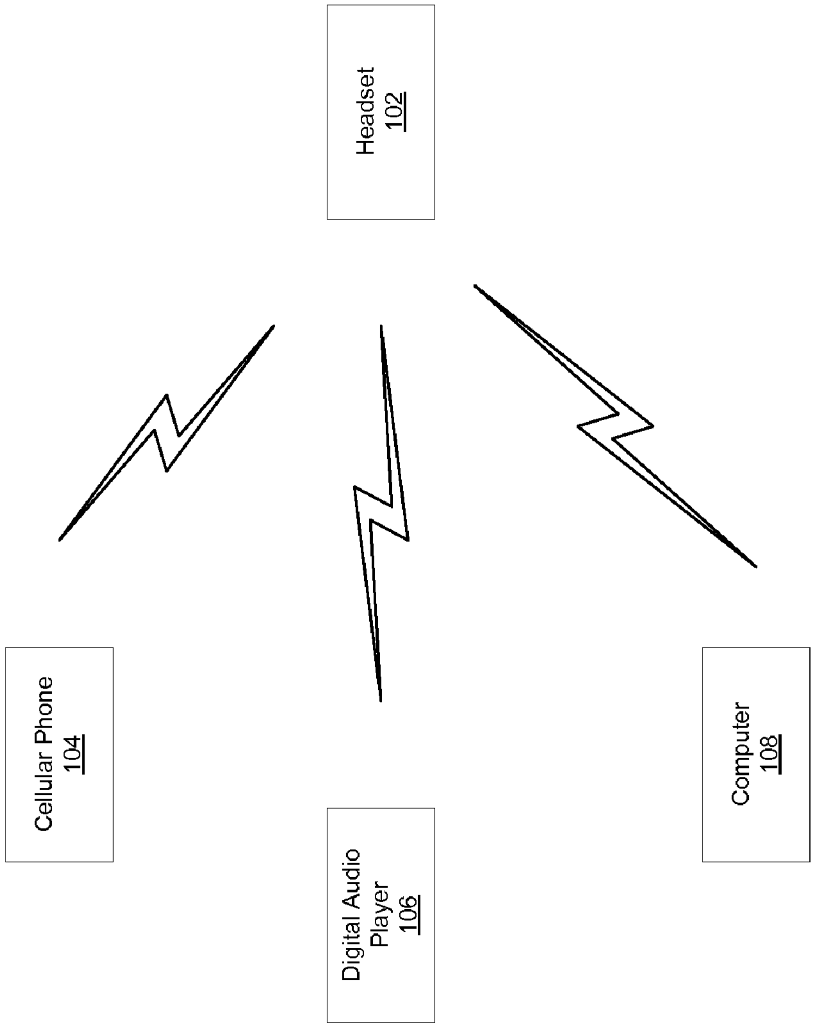
FIG. 1 is a conceptual diagram illustrating an example of a wireless communications system.

In accordance with common practice the various features illustrated in the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect may comprise one or more elements of a claim.

Several aspects of a receiver system will now be presented. This receiver system is well suited for integration into a headset (e.g., headphones, an earpiece, etc.), but may be integrated into other audio devices such as a phone (e.g., cellular phone), a personal digital assistant (PDA), an entertainment device (e.g., a music or video device), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), a medical monitor that may receive data from the medical sensing device, an environment sensing device (e.g., a tire pressure monitor), a computer, a point-of-sale device, an entertainment device, a hearing aid, a set-top box, or any other device that provides audio to a user. The node may include various components in addition to the receiver system. By way of example, a headset may include a transducer configured to provide an audio output to a user, a watch may include a user interface configured to provide an indication to a user, and a sensing device may include a sensor configured to provide an audio output to a user.

In many of the applications described above, the receiver system may be part of a node that transmits as well as receives. Such a node would therefore require a transmitter, which may be a separate component or integrated with the receiver system into a single component known as a "transceiver." As those skilled in the art will readily appreciate, the various concepts described throughout this disclosure are applicable to any suitable receiver function, regardless of whether the receiver system is a stand-alone node, integrated into a transceiver, or part of a node in a wireless communications system.

In the following detailed description, various aspects of a receiver system will be presented for rendering ambient signals in a headset, however, as those skilled in the art will readily appreciate, these aspects are likewise applicable to receiver systems for other applications. Turning to FIG. 1, a headset 102 is shown in communication with various devices including a cellular phone 104, a digital audio player 106 (e.g., MP3 player), and a computer 108. At any given time, the headset 102 may be receiving audio from one of these devices or multiple devices. The audio received by the headset 102 may be in the form of an audio file that is stored in memory of the digital audio player 106 or the computer 108. Alternatively, or in addition to, the headset 102 may also receive streamed audio from the computer 108 through a connection to a wide area or local area network. A wide area network is a wireless network covering a regional, nationwide, or even a global region such as the Internet. A local area network is a network that generally covers ten to a few hundred meters and is generally found in homes, offices, coffee shops, airports, hotels, and other locales. The headset 102 may also receive audio in the form of voice communications from the cellular phone 104 during a call over a cellular network supports CDMA2000 or some other suitable telecommunications standard.

The headset 102 is shown in FIG. 1 with a wireless connection between the various devices. Ultra-Wideband (UWB) is a suitable radio technology for supporting these wireless connections, however, as those skilled in the art will readily appreciate, any other suitable radio technology may be used (e.g., Bluetooth, WiMax, Wi-Fi, etc.). UWB is a common technology for high speed short range communications and is defined as any radio technology having a spectrum that occupies a bandwidth greater than 20 percent of the center frequency, or a bandwidth of at least 500 MHz. Alternatively, or in addition to, the headset 102 may have a wired connection to one or more of the devices (e.g., a computer 108). The wired connection may be a network connection, such as an Ethernet connection, or some other suitable connection. The headset 102 may also be configured to access an external storage device (e.g., a memory card containing MP3 files via a USB port).

Figure 2:
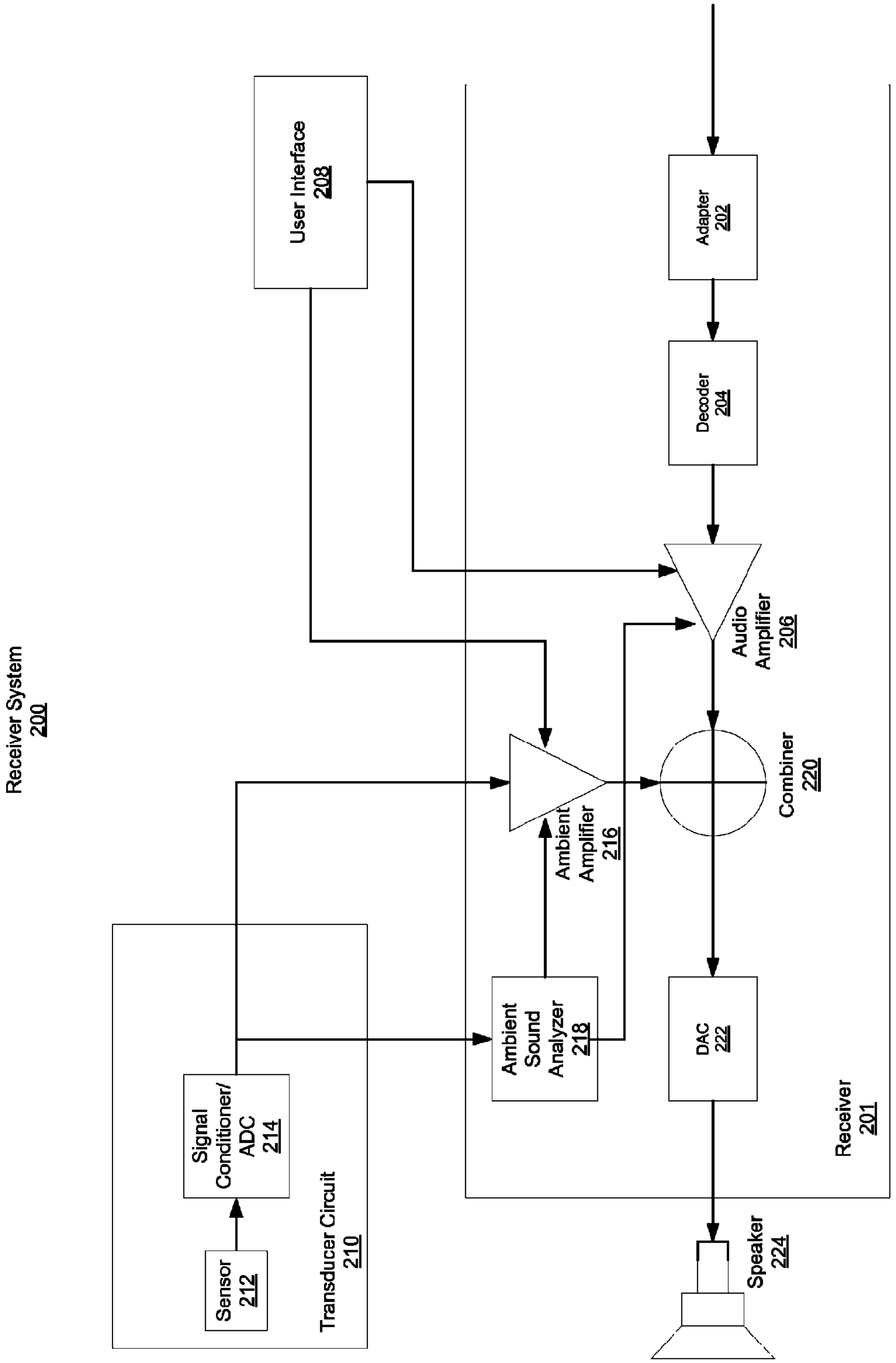
FIG. 2 is a schematic block diagram illustrating an example of a receiver.

FIG. 2 is a schematic block diagram illustrating an example of a receiver system. The receiver system 200 is shown with a receiver 201. The receiver 201 includes an adapter 202, a decoder 204, an audio amplifier 206, an ambient amplifier 216, an ambient sound analyzer 218, combiner 220, and a Digital-to-Analog Converter (DAC) 222.

The adapter 202 provides the interface for the receiver system to the audio source. In one configuration of a receiver system, the adapter 202 may be configured to implement the physical (PHY) and the Medium Access Control (MAC) layers of a receiver system capable of supporting a wireless or wired connection to a transmission medium. By way of example, the PHY and MAC layers may be configured to support UWB over a wireless medium. The PHY layer implements all the physical and electrical specifications to interface the receiver system 200 to the wireless and/or wired medium. More specifically, the PHY layer is responsible for providing various processing functions such as forward error correction (e.g., Turbo decoding), digital demodulation (e.g., FSK, PSK, QAM, etc.), and in the case of a wireless transmission, demodulating an RF carrier to recover an audio signal. The MAC layer manages the audio content that is sent across the PHY layer making it possible for several devices to communicate with the receiver system 200.

Alternatively, or in addition to, the adapter 202 may be configured to interface the receiver system 200 to an external storage device (not shown). Examples of external storage devices include flash disks or drives, flash cards, secure data flash cards, pen drives, compact disks (CD), magnetic disks, multimedia memory cards, secure digital cards, memory sticks, CompactFlash cards, SecureDigital cards, and SmartMedia cards. An external storage device may be connected to the adapter 202 through a USB port (not shown) on the receiver system 200 or by any other suitable means.

The audio signal recovered by the adapter 202 may be encoded according to a given audio file format or streaming audio format. In such a case, the decoder 204 may be used to reconstruct the audio signal from the encoded transmission recovered by the adaptor 202. In one example of a receiver system, the decoder 204 may be configured to reconstruct an audio signal encoded with a backward adaptive gain ranged algorithm; however, the decoder 204 may be configured to handle other encoding schemes. Those skilled in the art will be readily able to implement the appropriate decoder 204 for any particular application. The decoder 204 may be a stand-alone component as shown in FIG. 2, or integrated into an audio codec in the case where the receiver system is part of a headset that transmits as well as receives.

The decoded audio signal is provided to the audio amplifier 206. The audio amplifier 206 provides a means for adjusting the gain of the decoded audio signal. In this example, the gain of the audio amplifier 206 may be adjusted manually adjusted by a user via a user interface 208 to control the volume of the headset. A button, knob, or other means (not shown) may be provided in the user interface 208 to enable the user to manually adjust the gain of the audio amplifier 206. As will be discussed in greater detail later, the gain of the audio amplifier 206 may also be adjusted automatically based on an ambient signal. As used herein, an "ambient signal" shall be understood to encompass any signal in the audio band that is not part of the audio signal. An "audio signal" shall be understood to encompass any signal received from an audio source. By way of example, an "audio signal" may be streamed audio (e.g., music) from a computer, an audio file (e.g., MP3 file) from a computer, digital audio player (e.g., MP3 player), or memory card, or voice from a cellular telephone. An "ambient signal" may be the voice of a person in close proximity of the headset, a broadcast from a different speaker, a siren from an emergency vehicle or device, etc.

The receiver system 200 further includes a transducer circuit 210 including a sensor 212 and a signal conditioner/Analog-to-Digital Converter (ADC) 214. In this example, the sensor is an audio transducer (e.g., microphone).

An ambient signal may be received by the audio transducer 212 and provided to the signal conditioner/ADC 214. The signal conditioner/ADC 214 processes the ambient signal received by the sensor 212 before outputting from the transducer circuit 210. The signal conditioner/ADC 214 may include any of a variety of well known components such as amplifiers, attenuators, filters, electrical isolators, etc., as well as an ADC to convert the ambient signal to a digital signal.

The ambient signal output from the transducer circuit 210 may be scaled by the ambient amplifier 216. Similar to the audio amplifier 206, the ambient amplifier 216 may be manually adjusted by a user via the user interface 208, or, in a manner to be described in greater detail later, be adjusted automatically based on the ambient signal. A second button, knob or other means (not shown) may be provided in the user interface 208 for manually adjusting the gain of the ambient amplifier 216.

The ambient sound analyzer 218 analyzes the ambient signal and may, in certain circumstances, override the user gain control settings to automatically control the gain of one or both of the amplifiers 206, 216. The ambient sound analyzer 218 may include a programmable storage medium such as RAM memory, flash memory, EPROM memory, etc. with predetermined ambient signals recorded therein. The ambient sound analyzer 218 may further include a comparator circuit (not shown) for comparing an ambient signal received by the transducer circuit 210 with any preprogrammed audio signals. In this example, if the ambient sound analyzer 218 does not recognize the received ambient signal, the gains of the amplifiers 206, 216, respectively, are controlled by the user via the user interface 208. If the ambient sound analyzer 218 recognizes the received ambient signal as a preprogrammed signal, e.g., in frequency, beat, amplitude, etc., the ambient sound analyzer 218 assumes control of the gains of the amplifiers 206, 216. By way of example, a user or manufacturer may program the ambient sound analyzer 218 with the sound of a fire alarm, a tone broadcast by the emergency broadcast system, or one or more particular ring tones. Then, if any of the preprogrammed signals is received by the transducer circuit 210 as ambient signal, the ambient sound analyzer 218 may increase the gain of the ambient amplifier 216 and decrease the gain of the audio amplifier 206 to alert a user to the ambient signal. Accordingly, a user may be promptly alerted to an incoming telephone call or an alarm signal.

A combiner 220, such as an adder or other means, may be used to combine the scaled ambient and audio signals. The combined signal is converted to an analog signal via the DAC 222 and output through a speaker 224 such as in headphones, for example.

Independent, user controlled ambient and audio signal gain control is a very powerful feature during audio playback. The user can choose to experience noise-free audio playback by setting the gain of the ambient amplifier 216 to zero. The user may decide to engage another in conversation without removing the headset by setting the gain of the audio amplifier 206 to zero. The user may also mix different levels of audio and ambient signals by controlling the two independent gain knobs for the amplifiers 206, 216.

Further, as described above, with the additional logic provided for automatic gain control, the gains of the amplifiers 206, 216 can be made to automatically change based on certain known stimuli. For example, the gain of the ambient amplifier 216 could be programmed to be set to full scale and the gain of the audio amplifier 206 to zero in the event of a fire-alarm. This will allow users to quickly respond to emergency signals that might not have been audible in a traditional in-ear-canal earphone scenario. Other instances of this mode are possible.

Figure 3:
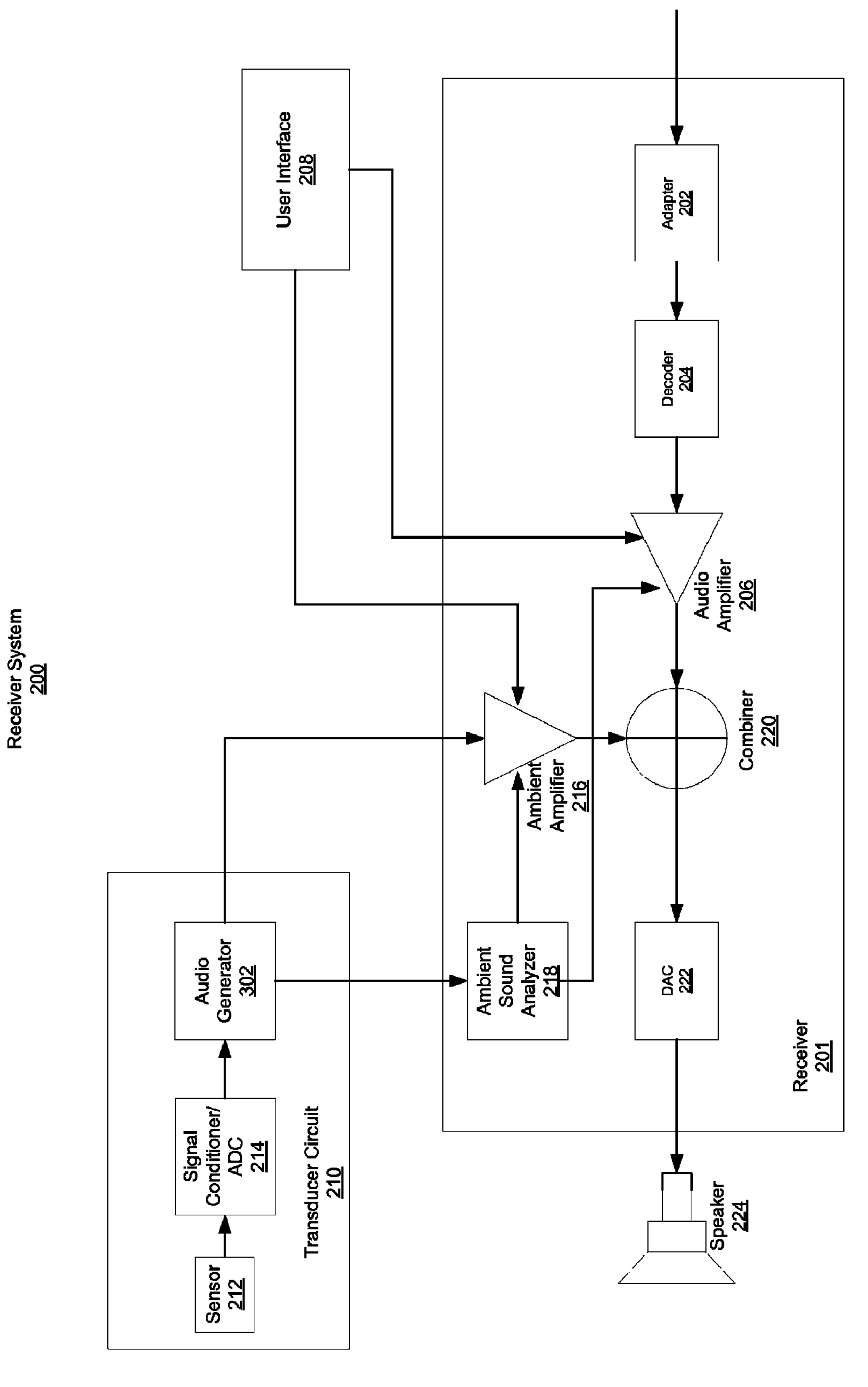
FIG. 3 is a schematic block diagram illustrating another example of a receiver.

FIG. 3 is a schematic block diagram illustrating another example of the receiver system. In this example, the receiver system is very similar to the receiver system discussed in connection with FIG. 2, and therefore, only the differences will be described.

In this example, the sensor 212 is a non-audio sensor that detects one or more ambient conditions. By way of example, the sensor 212 may be a detector that provides and generates a signal when it senses an ambient condition such as smoke (i.e., a smoke detector). The signal is processed by the signal conditioner/ADC 214 and provided to an audio generator 302. The audio generator 302 is configured to generate an ambient signal. As described in greater detail earlier, the ambient signal may be amplified by the ambient amplifier 216, combined with the audio signal by the combiner 220, converted to an analog signal, and provided to the speaker 224. The ambient sound analyzer 218 may be programmed, in this instance, to set the gain of the audio amplifier 206 to zero to ensure that the user is alerted to the ambient condition (i.e., smoke). As used herein, an "ambient condition" will be understood to encompass any ambient disturbance that is not part of the audio signal including ambient signals (i.e., any signal in the audio band that is not part of the audio signal) and disturbances outside the audio band (e.g., smoke).

Figure 4:
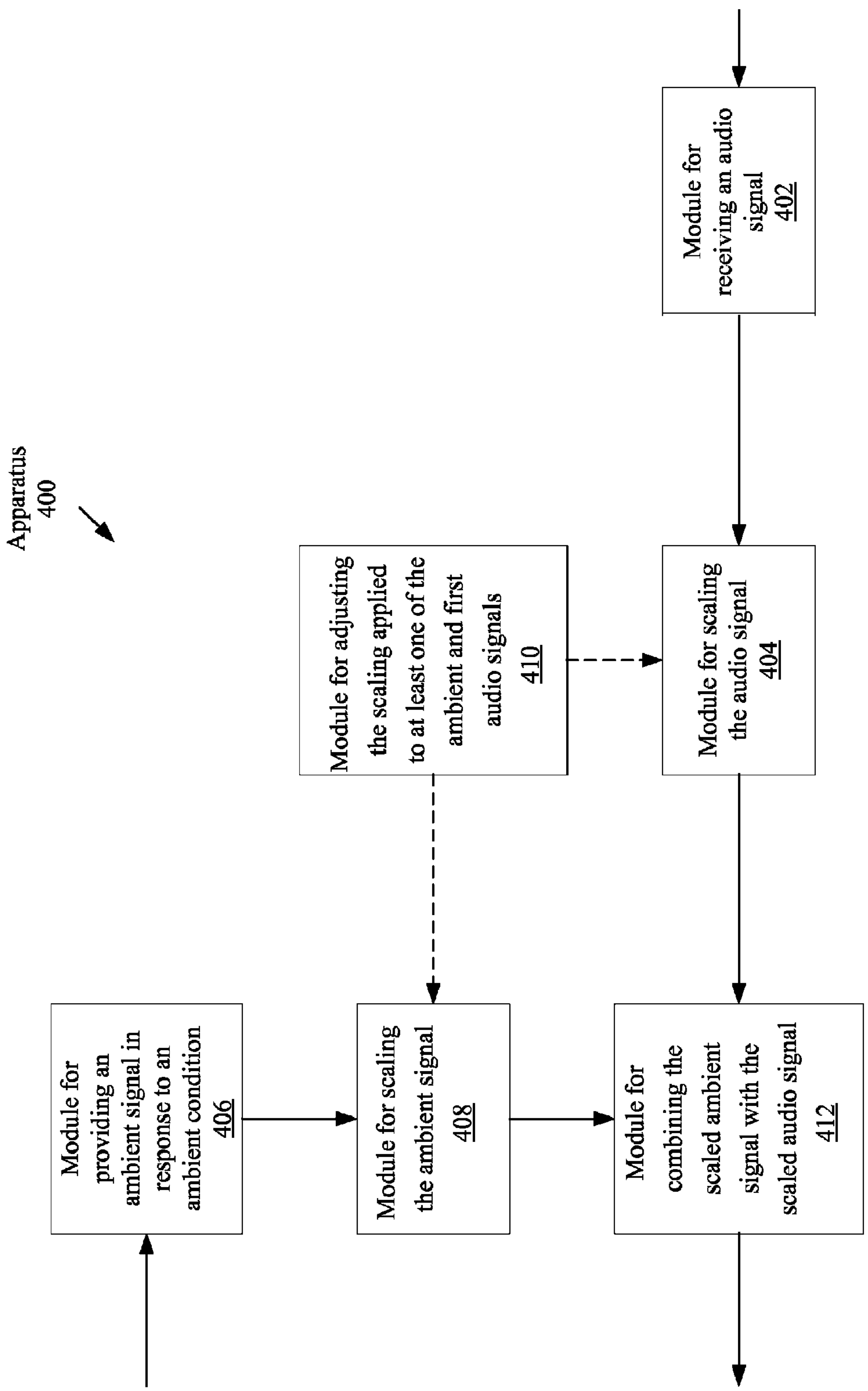
FIG. 4 is a block diagram illustrating an example of the functionality of a receiver.

FIG. 4 is a block diagram illustrating an example of the functionality of a receiver.

In this example, the apparatus 400 includes a module 402 for receiving an audio signal and a module 404 for scaling the audio signal. These modules may be implemented by the receiver 201 (see FIG. 2) described above or by some other suitable means. The apparatus 400 also includes a module 406 for providing an ambient signal in response to an ambient condition, which may be implemented by the transducer circuit 210 (see FIG. 2) described above or by some other suitable means. The apparatus further includes a module 408 for scaling the ambient signal, a module 410 for adjusting the scaling applied to at least one of the ambient and first audio signals, and a module 412 for combining the scaled ambient signal with the scaled audio signal. These modules may also be implemented by the receiver 201 (see FIG. 2) described above or by some other suitable means.

The components described herein may be implemented in a variety of ways. For example, an apparatus may be represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof. Such an apparatus may include one or more modules that may perform one or more of the functions described above with regard to various figures.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components.

As noted above, an apparatus may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions described herein may be implemented using any suitable means. Such means also may be implemented, at least in part, using corresponding structure as taught herein. For example, the components described above may be implemented in an "ASIC" and also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise, a set of elements may comprise of one or more elements. In addition, terminology of the form "at least one of: A, B, or C" used in the description or the claims means "A or B or C or any combination thereof."

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communication, comprising:
- a receiver configured to receive an audio signal; and
- a transducer circuit configured to provide an ambient signal in response to an ambient condition; wherein:
- the receiver is further configured to analyze the ambient signal and, based on the analysis of the ambient signal, selectively switch between enabling the receiver to adjust scaling applied to the ambient and audio signals based on the ambient signal and enabling a user interface to adjust scaling applied to the ambient and audio signals, and
- the receiver is further configured to combine the scaled ambient signal with the scaled audio signal.

2. The apparatus of claim 1, wherein:
- the receiver comprises a plurality of amplifiers configured to scale the ambient and audio signals; and
- based on the selective switching, the amplifiers are controlled by either the user interface or the receiver.

3. The apparatus of claim 1, wherein the receiver comprises an adapter configured to receive a transmission comprising the audio signal.

4. The apparatus of claim 1, wherein the receiver comprises an adapter configured to provide an interface to a storage device having the audio signal stored thereon.

5. The apparatus of claim 1, wherein the receiver comprises a digital-to-analog converter configured to provide the combined ambient and audio signals to a speaker.

6. The apparatus of claim 1, wherein the receiver comprises an ambient sound analyzer configured to perform the analysis of the ambient signal.

7. The apparatus of claim 1, wherein the transducer circuit comprises an audio generator configured to generate the ambient signal in response to the ambient condition.

8. The apparatus of claim 7, wherein the transducer circuit further comprises a sensor configured to receive the ambient condition and provide the ambient condition to the audio generator.

9. A method for communication, comprising:
- receiving an audio signal;
- scaling the audio signal;
- providing an ambient signal in response to an ambient condition;
- scaling the ambient signal;
- analyzing the ambient signal;
- based on the analysis of the ambient signal, selectively switching between enabling the scaling applied to the ambient and audio signals to be adjusted based on the ambient signal and enabling the scaling applied to the ambient and audio signals to be adjusted by a user; and
- combining the scaled ambient signal with the scaled audio signal.

10. The method of claim 9, further comprising receiving a transmission comprising the audio signal.

11. The method of claim 9, further comprising retrieving the audio signal from a storage device.

12. The method of claim 9, further comprising providing the combined ambient and audio signals to a speaker.

13. The method of claim 9, further comprising adjusting the scaling applied to the ambient and audio signals in response to the ambient condition.

14. The method of claim 9, further comprising generating the ambient signal in response to the ambient condition.

15. An apparatus for communication, comprising:
- means for receiving an audio signal;
- means for scaling the audio signal;
- means for providing an ambient signal in response to an ambient condition;
- means for scaling the ambient signal;
- means for analyzing the ambient signal;
- means for, based on the analysis of the ambient signal, selectively switching between enabling the scaling applied to the ambient and first audio signals to be adjusted based on the ambient signal and enabling the scaling applied to the ambient and audio signals to be adjusted by a user interface means; and
- means for combining the scaled ambient signal with the scaled audio signal.

16. The apparatus of claim 15, further comprising means for receiving a transmission comprising the audio signal.

17. The apparatus of claim 15, further comprising means for retrieving the audio signal from a storage device.

18. The apparatus of claim 15, further comprising means for providing the combined ambient and audio signals to a speaker.

19. The apparatus of claim 15, further comprising means for adjusting the scaling applied to the ambient and audio signals based on the ambient condition.

20. The apparatus of claim 15, further comprising means for generating the ambient signal in response to the ambient condition.

21. The apparatus of claim 20, further comprising means for receiving the ambient condition.

22. A computer program product for communication, comprising:
- a non-transitory computer-readable medium comprising instructions executable to:
  - receive an audio signal from an electronic source;
  - scale the audio signal;
  - receive an ambient signal that is generated in response to an ambient condition;

scale the ambient signal;

analyze the ambient signal;

based on the analysis of the ambient signal, selectively switch between enabling the scaling applied to the ambient and audio signals to be adjusted based on the ambient signal and enabling the scaling applied to the ambient and audio signals to be adjusted by a user; and combine the scaled ambient signal with the scaled audio signal.

23. A headset, comprising:

a speaker;

a receiver configured to receive an audio signal;

a transducer circuit configured to provide an ambient signal in response to an ambient condition; wherein:

the receiver is further configured to analyze the ambient signal and, based on the analysis of the ambient signal, selectively switch between enabling the receiver to adjust scaling applied to the ambient and audio signals based on the ambient signal and enabling a user interface to adjust scaling applied to the ambient and audio signals, and the receiver is further configured to combine the scaled ambient signal with the scaled audio signal, and provide the combined scaled ambient and audio signals to the speaker.

24. A watch, comprising:

a user interface;

a receiver configured to receive an audio signal; and a transducer circuit configured to provide an ambient signal in response to an ambient condition; wherein:

the receiver is further configured to analyze the ambient signal and, based on the analysis of the ambient signal, selectively switch between enabling the receiver to adjust scaling applied to the ambient and audio signals based on the ambient signal and enabling the user interface to adjust scaling applied to the ambient and audio signals, and the receiver is further configured to combine the scaled ambient signal with the scaled audio signal, and provide the combined scaled ambient and audio signals to the user interface.

25. A sensing device, comprising:

a sensor;

a receiver configured to receive an audio signal; and a transducer circuit configured to provide an ambient signal in response to an ambient condition; wherein:

the receiver is further configured to analyze the ambient signal and, based on the analysis of the ambient signal, selectively switch between enabling the receiver to adjust scaling applied to the ambient and audio signals based on the ambient signal and enabling a user interface to adjust scaling applied to the ambient and audio signals, and the receiver is further configured to combine the scaled ambient signal with the scaled audio signal, and provide the combined scaled ambient and audio signals to the sensor.

26. The apparatus of claim 1, wherein the analysis of the ambient signal comprises comparing the ambient signal with at least one preprogrammed audio signal.

27. The apparatus of claim 26, wherein, if the comparison indicates that the ambient signal is not recognized as one of the at least one preprogrammed audio signal, the selective switching enables the user interface to adjust the scaling applied to the ambient and audio signals.

28. The apparatus of claim 1, wherein the transducer circuit further comprises:

a non-audio sensor configured to sense the ambient condition and generate an indication of the ambient condition; and an audio generator configured to generate the ambient signal in response to the indication of the ambient condition.

29. The method of claim 9, wherein the analysis of the ambient signal comprises comparing the ambient signal with at least one preprogrammed audio signal.

30. The method of claim 29, wherein, if the comparison indicates that the ambient signal is not recognized as one of the at least one preprogrammed audio signal, the selective switching enables the user to adjust the scaling applied to the ambient and audio signals.

31. The method of claim 9, wherein:

a non-audio sensor senses the ambient condition and generates an indication of the ambient condition; and an audio generator generates the ambient signal in response to the indication of the ambient condition.

32. The apparatus of claim 15, wherein the analysis of the ambient signal comprises comparing the ambient signal with at least one preprogrammed audio signal.

33. The apparatus of claim 32, wherein, if the comparison indicates that the ambient signal is not recognized as one of the at least one preprogrammed audio signal, the selective switching enables the user interface means to adjust the scaling applied to the ambient and audio signals.

34. The apparatus of claim 15, wherein the means for providing an ambient signal comprises:

non-audio sensing means for sensing the ambient condition and generating an indication of the ambient condition; and audio generation means for generating the ambient signal in response to the indication of the ambient condition.

* * * * *